(12) United States Patent
Simpson

(10) Patent No.: US 7,563,377 B1
(45) Date of Patent: Jul. 21, 2009

(54) METHOD FOR REMOVING IRON DEPOSITS IN A WATER SYSTEM

(75) Inventor: Greg D. Simpson, Seabrook, TX (US)

(73) Assignee: Chemical, Inc., Grapevine, TX (US)

( * ) Notice: Subject to any disclaimer, the term of this patent is extended or adjusted under 35 U.S.C. 154(b) by 455 days.

(21) Appl. No.: 11/366,755

(22) Filed: Mar. 2, 2006

Related U.S. Application Data

(60) Provisional application No. 60/658,138, filed on Mar. 3, 2005.

(51) Int. Cl.
 C02F 1/76 (2006.01)

(52) U.S. Cl. .......................... 210/698; 134/3; 166/300; 166/305; 166/312; 210/747; 210/756

(58) Field of Classification Search ................. 210/756
 See application file for complete search history.

(56) References Cited

U.S. PATENT DOCUMENTS

| | | | |
|---|---|---|---|
| 3,899,027 A * | 8/1975 | Jenkins | ........................ 166/302 |
| 4,190,463 A | 2/1980 | Kaplan | |
| 4,276,185 A | 6/1981 | Martin | |
| 4,683,954 A | 8/1987 | Walker et al. | |
| 4,892,148 A | 1/1990 | Mason | |
| 4,945,992 A | 8/1990 | Sacco | |
| 5,069,286 A * | 12/1991 | Roensch et al. | ............. 166/312 |
| 5,078,858 A | 1/1992 | Hart et al. | |
| 5,128,046 A | 7/1992 | Marble et al. | |
| 5,466,297 A | 11/1995 | Goodman et al. | |
| 5,719,100 A | 2/1998 | Zahradnik et al. | |
| 6,599,432 B2 * | 7/2003 | Kross et al. | ................. 210/754 |
| 6,641,740 B2 * | 11/2003 | Cornelius et al. | ........... 210/698 |
| 7,252,096 B2 * | 8/2007 | Gill et al. | ................. 134/22.12 |
| 7,285,221 B2 * | 10/2007 | Tsuneki et al. | ............... 210/701 |
| 7,470,330 B2 * | 12/2008 | Keatch | ........................ 134/26 |

FOREIGN PATENT DOCUMENTS

CA 1207269 7/1986

* cited by examiner

*Primary Examiner*—Peter A Hruskoci
(74) *Attorney, Agent, or Firm*—F. Lindsey Scott

(57) ABSTRACT

A method and composition and system which for the oxidation, clean up, removal and control of iron and iron deposits in water and the removal of iron deposits and bacterial bio-films from surfaces in water systems. The composition contains sodium chlorite, sodium hypochlorite and citric acid.

14 Claims, 1 Drawing Sheet

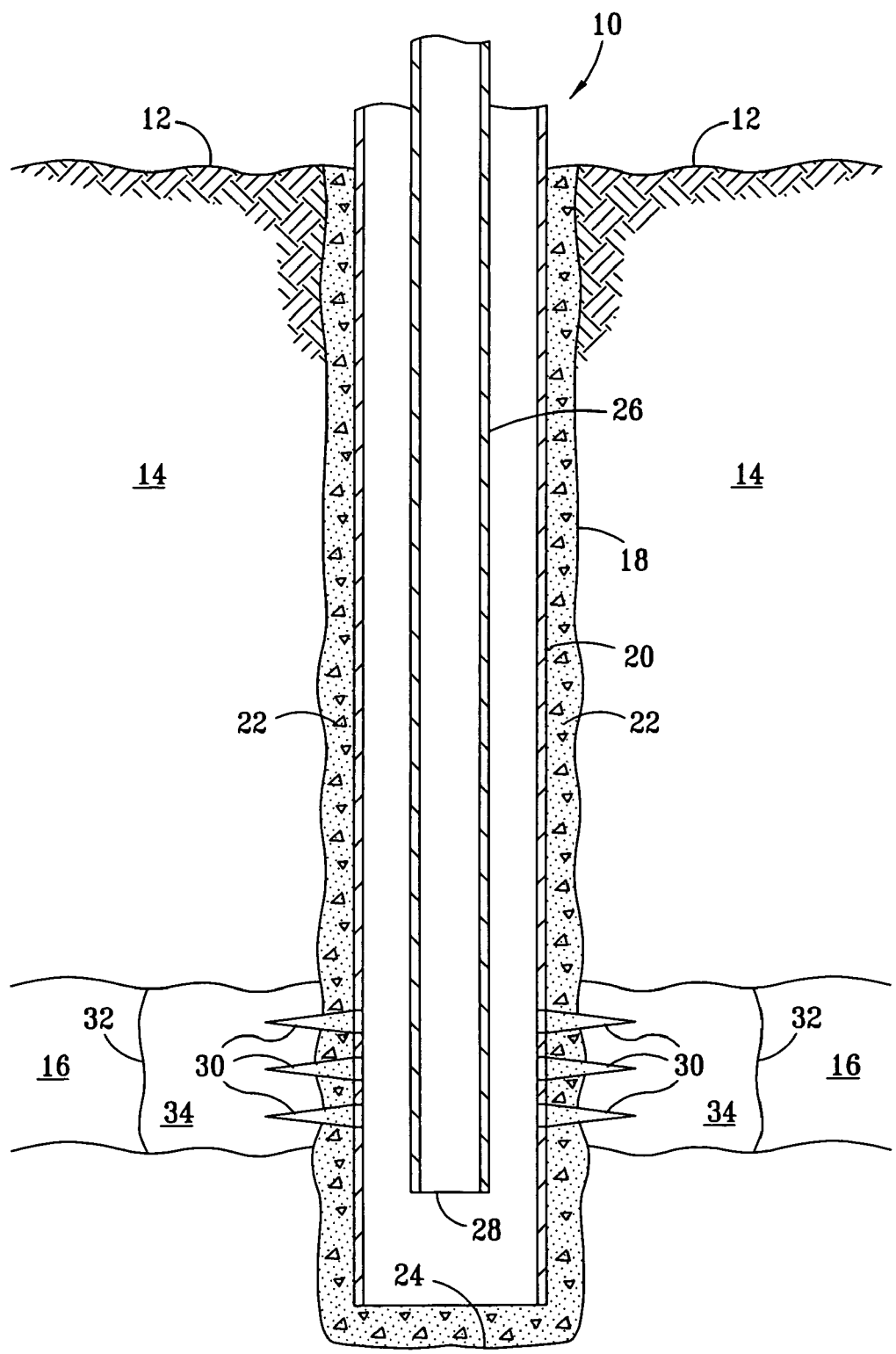

METHOD FOR REMOVING IRON DEPOSITS IN A WATER SYSTEM

RELATED CASES

This application is entitled to and hereby claims the benefit of the filing date of U.S. provisional application, 60/658,138 filed Mar. 3, 2005 by Greg D. Simpson and titled "Oxidation, Cleanup, Removal or Control of Fe and FeS Deposits."

FIELD OF THE INVENTION

The present invention relates to the removal of iron deposits from surfaces in a water system. The field of the invention also contemplates the oxidation, clean up, removal and control of iron and iron sulfide deposits in water. The present invention also contemplates the removal of bacterial biofilms from surfaces in water systems.

BACKGROUND OF THE INVENTION

Many systems have been proposed and used to remove bacterial growth and the like from surfaces in a water system. Some systems, such as disclosed in U.S. Pat. No. 4,892,148 issued Jan. 9, 1990 to James A. Mason and U.S. Pat. No. 5,719,100 issued Feb. 17, 1998 to Zradnick, et al use sodium chlorite and citric acid to treat water. These two patents are hereby incorporated in their entirety by reference. Systems such as these result in cleaning but the production of chlorine dioxide is relatively slow and the oxidizing effect of the solution is quickly spent when the solution is prepared offsite or even if the materials are injected for reaction in-situ. Such processes also result in the production of hydrochloric acid and sulfuric acid when materials such as iron sulfide are present in the formation.

In industrial water systems, such as open recirculating cooling systems, once through systems or closed systems, iron can form deposits. The iron can enter the system via make up water, which is used to replace that lost through evaporation. While this is one source of iron, the majority of the iron comes from corrosion of ferrous metals in the system. Iron deposits are very thermally insulating and losses in heat transfer occur, thus it is desirable to remove these deposits. Two methods of removing these deposits have been used. i.e., "on-line" and "off-line". When such fouling occurs it is not uncommon to mechanically or chemically clean the iron off the metal surfaces. Some types of cleaning require that the unit being treated be shut down (off-line). Such shut-downs can result in production losses, which are generally very expensive. In addition, off-line cleaning typically generates a substantial amount of waste solution, which can be hazardous depending upon what, and how much is present. An example of off-line cleaning is given in U.S. Pat. No. 4,190,463 issued Feb. 26, 1986 to Roy L, Kaplan, which is hereby incorporated in its entirety by reference.

Obviously in situations such as heat exchangers in which water is used as a heat exchange fluid, the presence of such deposits is very undesirable and can greatly reduce the effectiveness of the heat exchange equipment. One process for removing these materials is the use of acids. While this has been limitedly effective and will reduce deposits such as lime deposits which may also exist in such systems, the strong acids required are very corrosive to the ferrous equipment in which they are used. Accordingly, such clean ups may damage the equipment in the process of removing a portion of the iron salts and deposits as well as any other deposits in the area.

Another area of interest is the production of fluids from subterranean formations. Water wells are prone to deposits of iron compounds on surfaces where the water emerges from the subterranean water-bearing formation or on the surfaces of the fluid-producing equipment. This iron may come from ferrous components in the water-producing equipment in the system or from the formation itself. Similarly biological growth may occur in such systems. While the use of chlorine produced at the surface and injected may be effective to remove the biological growth it is not generally effective for removal of iron deposits. Again these deposits can be very detrimental in that they may restrict the flow of fluids and may affect the performance of the equipment required to produce the fluids.

Particularly in oil or gas wells where the wells may produce at least one of oil or gas in addition to water, it is well known that bacterial growth can occur in many areas in the well. These deposits can have the effect of forming hydrogen sulfide, which is a corrosive by-product.

Chlorine is a strong oxidizer and has been used for many years for treating water. Its action is well known and very effective at low levels. There are also a number of other oxy-chlorine compounds available, which are powerful oxidizers and can be used in place of chlorine. These materials have the advantages of biocidal activity, the ability to react with ferrous and other sulfides to produce sulfates and the ability to oxidize ferrous deposits in place. Through proper product design and application, certain of these materials can be effectively applied to problems in the oil fields. These materials, however, typically have the disadvantage that while oxidizing biocidal materials and oxidizing sulfide salts of iron, the iron is converted from ferrous iron to ferric iron which has a much lower solubility in water. Reacted materials may produce strong mineral acids, if present in sufficient quantities, and can dissolve some of the ferric iron deposits. However, these acids can be damaging to ferrous materials in the system for producing fluids from the particular formation.

Accordingly it is highly desirable that a system be available which can be used in all these systems to remove iron deposits, biocidal deposits and the like by solublizing the iron without adversely affecting the ferrous materials used to fabricate the fluid recovery or fluid handling system.

Accordingly a search has continued for a formulation which can be used to achieve these objectives without damaging ferrous equipment in water systems.

SUMMARY OF THE INVENTION

According to the present invention, a method is provided for removing and controlling iron deposits in a water system, the method comprising: injecting an aqueous stream containing at least one of potassium and sodium chlorite, at least one of potassium and sodium hypochlorite and citric acid into the water system; and, removing iron deposits from the water system surfaces by contacting the water system surfaces with the aqueous stream to produce an iron-containing aqueous stream.

The invention further comprises an aqueous composition for removing iron deposits from surfaces in a water system, the composition consisting essentially of an aqueous solution containing at least one of potassium and sodium chlorite, at least one of potassium and sodium hypochlorite and citric acid.

The invention also comprises a method for removing iron deposits from a water system comprising a well penetrating a subterranean formation from an earth surface, the method comprising: injecting an aqueous stream containing at least one of potassium and sodium chlorite, at least one of potassium and sodium hypochlorite and citric acid into the well; and, removing iron deposits from the surfaces of fluid handling apparatus in the well by contact with the aqueous stream to produce an iron-containing aqueous stream.

BRIEF DESCRIPTION OF THE DRAWINGS

The FIGURE is a schematic diagram of a well penetrating a subterranean formation from an earth surface for the production of fluids, which include aqueous components of fluids from the subterranean formation.

DESCRIPTION OF PREFERRED EMBODIMENTS

In the FIGURE a well 10 is shown extending from an earth surface 12 through an overburden 14 and penetrating a formation 16. The well comprises a wellbore 18, including a casing 20, which is cemented in place with cement 22. The casing extends to near a bottom 24 of the well. A tubing 26 is provided inside the casing for the production of fluids from subterranean formation 16. Perforations 30 are positioned through casing 20 in formation 16 to permit the flow of fluids from formation 16 into the casing. These fluids are then produced by pumping, natural flow from the formation or the like through the tubing 26 to the surface. A line 32 defines a near wellbore zone 34.

As well known to those skilled in the art, pumps, valves, and the like are used to achieve the flows as described in well 10. If well 10 is a water well, water can flow into casing 20 via perforations 30 for production by pumping upwardly through tubing 26. Even if tubing 26 and casing 20 are non-ferrous, it is very likely that iron compounds will be produced with water from formation 16. Certainly materials such as calcium compounds and the like will be produced and it is very likely that biological growths will occur in the well over time. The production of fluids through the perforations 30 results in the accumulation of deposits at the entrance into the casing and the potential growth of a biological buildup at the entrance to the casing. To remove these materials, it is desirable that an aqueous solution capable of moving the materials be pumped downwardly through tubing 26 and into the annulus between tubing 26 and casing 20 and upwardly to the surface. The dissolved or solubulized materials can then be removed and recovered at the surface. Thereafter the well can be returned to usual production. It will be understood that the solublizing aqueous solution could be passed downwardly through the annulus and recovered upwardly through the tubing if desired.

When well 10 is an oil well, biocidal growth is of much greater concern and frequently higher pressures are encountered in formation 16 so that deposits tend to form at the outlet to perforations 30. Accordingly in many instances the near wellbore area 34, which is shown as the area inside lines 32, tends to accumulate iron and other deposits and more biocidal material since the pressure drop is higher across this area of the formation and since oxygen is more often available inside the casing for such growths. The area outside the near wellbore formation is less prone to this type of accumulation. The amount of formation which behaves as a near wellbore formation varies for each well and each formation.

It is undesirable that a strong oxidizing agent be used since it can dissolve portions of the formation to the detriment of continued production as well as reacting with and adversely affecting the components used to produce fluids from the formation.

According to the present invention, it has been found that a composition comprising an aqueous solution containing at least one of potassium and sodium chlorite, at least one of potassium and sodium hypochlorite and citric acid is effective to oxidize biocidal growth and convert compounds such as iron sulfide and the like into soluble iron compounds. Some of these compounds may be oxidized to ferric iron, which generally forms relatively water insoluble deposits. The formation of these ferric compounds is inhibited by the presence of citric acid which sequesters with the ferric iron to produce complexes of the iron and citric acid. These materials remain very soluble in water. The pH of such solutions is typically below about 4 and may be a low as 2. As a result there is minimal damage to the ferrous materials exposed in the fluid production system. This is also true for systems, which may be tanks for storing aqueous fluids, heat exchangers, water towers, and the like. Many such applications for aqueous streams, which may accumulate iron deposits and/or biocidal growth, contain iron sulfides or the like, are well known. All such systems are adequately treated using the composition of the present invention.

While potassium chlorite or potassium hypochlorite may be used either alone or in any combination with sodium chlorite and sodium hypochlorite, the sodium compounds are preferred, at least in part due to their greater availability. The invention will be discussed by reference to sodium compounds, although in some oil field applications the potassium compounds may be preferred.

Desirably the composition of the present invention contains from about 0.05 to about 0.35 weight percent sodium chlorite; from about 0.025 to about 0.15 weight percent sodium hypochlorite and from about 0.05 to about 0.6 weight percent organic acid. Preferably the organic acid is citric acid and desirably it is present in amounts from about 0.05 to about 0.6 weight percent based upon the composition of the aqueous stream.

The composition is readily prepared by mixing the desired portions of aqueous sodium chlorite, aqueous sodium hypochlorite and citric acid. These materials are available from a number of chemical suppliers as standard off-the-shelf materials.

The compositions including the citric acid have higher pHs in comparison to the mineral acids. For instance, a 12 percent solution of citric acid has a pH of almost 2 and since the purpose of the acid is to reduce the pH to the optimum range for chlorine dioxide generation, there is a much wider range of operation which permits the injection of the mixture of materials to generate an oxidant over a long distance into the formation or into the equipment.

In general, the applications of the present invention can extend to methods for removing and controlling iron deposits in a water system where the method comprises injecting an aqueous stream containing sodium chlorite, sodium hypochlorite and citric acid into the water system and removing the iron salts from the water system surfaces by contacting the water system surfaces with the aqueous stream to produce an iron-containing aqueous stream. The iron-containing aqueous stream in the event of a water injection well for hydrocarbon production or a hydrocarbon producing formation may simply be passed onwardly and outwardly into the formation beyond the range from which it will likely be recovered into the producing well.

In other applications, it may be desirable to recover the aqueous iron-containing stream for suitable treatment and disposal. Such applications include cooling tower treatments, water storage tank treatments, heat exchangers treatments, water well treatments, and the like. Desirably the aqueous solution is injected for a period of time or in an amount effective to achieve a desired residence time in the area of treatment. This can be readily regulated by adjusting the rates of injection of the aqueous stream and withdrawal of the iron-containing aqueous stream. In other words, the aqueous stream may recirculate in the particular equipment for a desired period of time or be injected in a sufficient quantity to achieve a desired residence time simply by the passage of the aqueous stream in a one-pass operation. The residence time required can be adjusted by increasing the strength of the aqueous stream.

As indicated previously, the aqueous composition of the present invention can be used in oil wells either to treat an injection water stream which is pumped into a flood system or to treat a water-containing stream which is withdrawn from a well as a mixture of water, oil and gas. Particularly the material may be injected into the well to either clean the annular space and the inside of the tubing for the production of fluids or it may be injected into the well in a near wellbore region to remove such materials. In such instances the aqueous stream may be recovered when production is resumed and can be passed to proper treatment. The composition may be injected after the production of chlorites at the surface or it may be injected for reaction in-situ. As indicated, the system can be used for water towers, heat exchangers, and a myriad of other applications where iron salts are desirably removed. The water system refers to any container, handling system process equipment, or the like which contains water.

By the use of the composition of the present invention, desirable results are achieved. Faster reactions are achieved at lower pHs than are possible with either of the two chlorite materials used alone with the citric acid. Surprisingly not only does the reaction with both materials occur quickly to produce chlorine dioxide for oxidation but it also results in a highly effective reaction of the citric acid immediately upon oxidation of ferrous ions to ferric ions to sequester the ferric iron before other complexing agents or reactants can tie up the iron. This makes for a much faster clean up of iron deposits or iron sulfite deposits. These sequestered materials are readily water-soluble and can be produced with the aqueous stream when removed from the area.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for removing and controlling iron deposits in a water system, the method consisting essentially of:
   a) injecting an aqueous stream containing at least one of potassium and sodium chlorite, at least one of potassium and sodium hypochlorite and citric acid into the water system wherein the aqueous stream is injected for reaction to produce chlorine dioxide in-situ in the water system; and,
   b) removing iron deposits from the water system surfaces by contacting the water system surfaces with the aqueous stream to produce an iron-containing aqueous stream including water soluble complexes of ferric iron sequestered with said citric acid.

2. The method of claim 1 wherein the aqueous stream contains sodium chlorite and sodium hypochlorite.

3. The method of claim 1 wherein the aqueous stream contains from about 0.05 to about 0.35 weight percent sodium chlorite; from about 0.025 to about 0.15 weight percent sodium hypochlorite and from about 0.05 to about 0.6 weight percent citric acid.

4. The method of claim 1 wherein the aqueous stream is injected and the iron-containing aqueous stream is withdrawn from the water system at rates effective to provide a desired residence time for the aqueous stream in the water system.

5. The method of claim 1 wherein the residence time is selected to provide a desired removal of iron deposits from surfaces in the water system.

6. The method of claim 1 wherein the water system is a cooling tower system and wherein the aqueous stream and the iron-containing aqueous stream are added and withdrawn respectively at rates sufficient to remove a desired quantity of iron salts at a selected rate.

7. The method of claim 1 wherein the water system comprises a heat exchange system wherein water is used as a heat exchange fluid.

8. The method of claim 1 wherein the water system is a water storage system.

9. A method for removing iron deposits from a water system comprising a well penetrating a subterranean formation from an earth surface, the method consisting essentially of:
   a) injecting an aqueous stream containing at least one of potassium and sodium chlorite, at least one of potassium and sodium hypochlorite and citric acid into the well wherein the aqueous stream is injected for reaction to produce chlorine dioxide in-situ in the water system; and,
   b) removing iron deposits from the surfaces of fluid handling apparatus in the well by contact with the aqueous stream to produce an iron-containing aqueous stream including water soluble complexes of ferric iron sequestered with said citric acid.

10. The method of claim 9 wherein the aqueous stream is injected into the well via a tubing extending into the water system and recovered via an annular space outside the tubing.

11. The method of claim 9 wherein the well is an oil well from which water and at least one of oil and gas are recovered and wherein the aqueous stream is injected into a near wellbore region around the well and thereafter recovered with fluids produced from the well.

12. The method of claim 9 wherein the well is an oil well from which water and at least one of oil and gas are recovered and wherein the aqueous stream is injected into the well beyond a near wellbore region around the well.

13. The method of claim 9 wherein the well is a water injection well in an oil or gas production system and wherein the aqueous stream is injected through the water injection well with water injected through the well.

14. The method of claim 9 wherein the aqueous stream is injected in an amount sufficient to provide a desired contact time with the surfaces of the fluid handling apparatus.

* * * * *

UNITED STATES PATENT AND TRADEMARK OFFICE
CERTIFICATE OF CORRECTION

PATENT NO.        : 7,563,377 B1
APPLICATION NO.   : 11/366755
DATED             : July 21, 2009
INVENTOR(S)       : Greg D. Simpson Page 1 of 1

It is certified that error appears in the above-identified patent and that said Letters Patent is hereby corrected as shown below:

Title Page, Item (73) Assignee, "Chemical, Inc." should be replaced with -- ChemCal, Inc. --.

Signed and Sealed this

Tenth Day of November, 2009

David J. Kappos
*Director of the United States Patent and Trademark Office*